United States Patent [19]

Perfetti

[11] Patent Number: 4,717,422

[45] Date of Patent: Jan. 5, 1988

[54] ANTI-SCALING OR MARKING COMPOSITION FOR APPLICATION TO METAL PRODUCTS AND METHOD OF MAKING AND USING THE COMPOSITION

[75] Inventor: Bruno M. Perfetti, Jeannette, Pa.

[73] Assignee: USX Corporation, Pittsburgh, Pa.

[21] Appl. No.: 445,790

[22] Filed: Dec. 1, 1982

[51] Int. Cl.$^4$ ............................................. C09D 11/00
[52] U.S. Cl. ..................................... 106/19; 106/23; 106/287.34; 106/309
[58] Field of Search ............. 106/19, 23, 38.3, 287.34, 106/309

[56] References Cited

U.S. PATENT DOCUMENTS 4,036,655  7/1977  Yamada et al. ..................... 106/38.3
4,169,735 10/1979  Boberski et al. ................... 106/38.3

OTHER PUBLICATIONS

Bulletin No. T-17-42, The P.Q. Corporation, Valley Forge, Pa. 19482.

*Primary Examiner*—Amelia Burgess Yarbrough
*Attorney, Agent, or Firm*—William F. Riesmeyer, III

[57] ABSTRACT

A method of making a composition suitable for application to metal products for anti-scaling purposes or to produce legible markings on said products, said method comprising; providing first and second soluble alkali metal silicate solutions, preferably soluble sodium silicate solutions having silicate ratios of about 2.0 to 2.8 and 3.0 to 3.9, respectively. The two starting solutions are mixed to form a third solution. The cross-linking binder material is added to one of the solutions prior to addition of the other solid materials or to the combined silicate solutions. Finally, the other solids and water as needed are added to provide the above-mentioned composition. Utilizing the two diverse starting solutions provides a final mixture having a lower viscosity than when a single soluble silicate starting solution of equivalent $SiO_2$ ratio is used. Thus, the water content of the composition may be substantially reduced without increasing the viscosity, thus enabling application of the composition to metal products that are at higher temperatures without flaking of the material from the metal surfaces upon subsequent cooling.

4 Claims, No Drawings

ANTI-SCALING OR MARKING COMPOSITION FOR APPLICATION TO METAL PRODUCTS AND METHOD OF MAKING AND USING THE COMPOSITION

BACKGROUND OF THE INVENTION

The present invention relates to a composition suitable for application to metal products for marking or antiscaling purposes, and to methods of making and using the composition, respectively.

There is an urgent need in the steel industry for marking inks which can be used to identify hot slabs and billets and will withstand surface temperatures exceeding 1600° F. Inks currently used bubble badly when applied on surfaces which are above 1600° F. and do not adhere when the surfaces cool to ambient temperatures. The composition of an ink currently used is disclosed in U.S. Pat. No. 3,640,737, Lankard and Sheets, Jr. of common ownership with the present application. U.S. Pat. No. 3,732,115, a division of the aforementioned patent and also of common ownership, covers the method of making this composition. The compositions disclosed in these references will not work much above 1600° F. and certainly not at 2000° F. which is of immediate interest for making hot steel mill products.

Applicant is not aware of any prior art suggesting use of borates to improve the high temperature properties of marking compositions and permit their use on metal products having surface temperatures above 1600° F. Borax is known to act as a chemical setting agent in alkali metal silicate systems. Because of its setting characteristics, borax is confined to use as an aftertreatment for improving moisture resistance of the silicate bond. Small amounts of borax may be used in coatings curable at room temperature to provide excellent water resistance. U.S. Pat. No. 4,169,735, Boberski et al teaches that from 0.1 to 0.5 percent of borate latent insolubilizers may be used in alkali metal silicate coatings based upon the combined weight of water-soluble silicate and borate latent insolubilizers. Example 6 of Boberski et al discloses the highest percentage of borate insolubilizer actually tested $$\frac{6.75 \text{ (g sodium borate)}}{356.75 \text{ (g sodium borate)} + \text{potassium silicate solution}} = 1.89\%$$

Relative to applicant's claimed composition the $B_2O_3$ equivalent 0.365 (6.75 g)=2.46 g $B_2O_3$ amounts of 0.78% of the total solids of Example 6. On the same basis, applicant's composition requires at least 1.5% $B_2O_3$ to obtain the desired high temperature properties for marking compositions. Moreover, applicant's composition is also distinguishable in that at least 50 percent of the alkali metal silicate must be sodium silicate. Finally, applicant's composition must be baked at temperatures of at least 250° F. whereas the Boberski composition is curable at room temperature.

It is therefore a primary object of the present invention to provide a composition suitable for application to metal products having temperatures significantly above 1600° F. for purposes of producing legible markings thereon.

It is another object of the present invention to provide a method of making such a composition.

It is a further object of the invention to provide a composition suitable for application as a coating on metal products to resist or prevent scaling of the metal surface during heating.

SUMMARY OF THE INVENTION

The composition of this invention includes solids of from about 30 to about 50 parts by weight of an opacifying pigment. The opacifying pigment preferably is titanium dioxide but may be zirconium silicate, zirconium oxide, any of various chromium oxides or chrome ores and mixtures of any of these materials. For antiscaling coatings the more refractory pigments such as chromium oxide, zirconium oxide, zirconium silicate and chrome ores are preferred. The solids portion of said composition also includes from about 43 to 58 parts by weight of water soluble alkali metal silicate as a binder material. At least 50 and preferably 90 percent of the alkali metal silicate must be sodium silicate. The remaining portion of the binder material may be potassium silicates, quaternary ammonium silicates and lithium silicates. The ratio of silicate-to-alkali metal oxide in the above-mentioned binder material is selected to be within the range of from about 2.60 to about 3.25. A cross-linking binder is included for the purpose of causing the silicates and pigments to coalesce or fuse into a single coherent matrix which is more adherent to the metal surface at temperatures within the range of 250° F. to 2500° F., particularly at temperatures over 1800° F. Melting of the constituents when applied to surfaces at elevated temperatures creates a viscous glass-like coating which retains its coherence upon cooling. Sufficient borax, boric oxide, borate or metal borates in the form of alkali metal borates, orthoborates, pyroborates, metaborates or more complex borate ions are added so as to provide from about 1.5 to 5 parts $B_2O_3$ in said solid constituents in the composition. The solids are selected in proportions such that the ratio of total pigment to total binder solids is within the range of 0.50 to 1.0. Total pigment refers to the sum of the opacifying and extender pigments, (as described hereinafter) whereas total binder refers to the sum of alkali metal silicate and total weight of the cross-linking, ($B_2O_3$ containing) binder material. Preferably, the pigment-to-binder ratio is within the range of 0.55 to 0.85. An extender pigment may be substituted on a one-to-one basis for a portion of the opacifying pigment in amounts of from about 6 to about 12 parts by weight of said solids. The extender pigment preferably is kaolin but may be any material selected from the group consisting of kaolin, magnesium silicate, calcium silicate, barium silicate, zirconium silicate, mica, wollastonite, barytes (pigments containing $BaSO_4$) and whitings such as calcium carbonate. Finally, the composition includes sufficient water to provide an overall viscosity in the final mixture of between 800 to 5000, preferably 1000 to 3000 centipoise.

The method of use of the composition includes applying the material to the surface of metal products and baking at temperatures of at least 250° F. The baking step may consist solely of application to metal products having surface temperatures within the range of about 250° F. to 2500° F., preferably 800° F. to 2200° F.

The method of making the composition includes starting with two diverse, solutions i.e. one having a $SiO_2$ to alkali-metal oxide ratio of from about 2.0 to about 2.8, the other having a ratio of from about 3.0 to about 3.9. The two solutions are mixed to provide a combined solution wherein at least 50 and preferably 90 percent of the alkali metal silicate is sodium silicate. The cross-linking binder is added to one of the three above-mentioned alkali metal silicate solutions prior to addition of the other solids. Preferably, it is added to the final solution concurrently with mixing of the two starting solutions. Utilizing two diverse starting solutions provides, after addition of the cross-linking binder and then the pigments, a final mixture having significantly lower viscosity than one of identical composition made from a single starting solution. This feature permits use of less water to produce a desired viscosity which in turn makes the composition less likely to flake, bubble or boil when applied to products at higher temperatures. The term "concurrently" is used in the sense that the diverse solutions are mixed but not appreciably chemically equilibrated prior to addition of the borate solid material. A preferred aspect of the method is to add the cross-linking binder solid first to the silicate solution having lower $SiO_2$ to $Na_2O$ ratio stabilizing that solution, and then proceeding to concurrently mix the two diverse solutions and add the balance of the solids. However, use of a premixed solution of the diverse soluble silicate components which has been allowed to age for periods of up to several weeks is entirely functional and operative within the scope of this invention.

DESCRIPTION OF THE PREFERRED EMBODIMENT

Representative examples illustrating the preferred embodiment of the invention are shown in Table I attached. The ingredients for each sample were added and combined in a high shear mixer in the order listed from the top to bottom of the left-hand column in Table I. The upper portion of Table II shows a breakdown of the various ingredients as a fraction of total solids expressed in percentage by weight. The lower portion of the table shows various relationships of the materials in each sample, namely the percent solids, the ratio of soluble silicate-to-alkali metal oxide, and the pigment to binder ratio. Pigment to binder ratio is defined as the weight of inert pigments in the composition divided by the sum of alkali metal silicate solids and cross-linking binder solids (i.e. total weight of borax and other borate constituents). The table also shows the viscosity of each sample as determined by Brookfield Viscometer in accordance with the procedure set forth in ASTM D2196-81. Viscosity measurements were made on each sample at 77° F. using a #3 spindle at a speed of 20 rpm. Stencil numerals from each sample were applied to steel panels which had a surface temperature of 2000° F. Following stencilling, the panels were air-cooled to about 900° F./1000° F. and then quenched in cold water. After air drying the stencil marks were vigorously scraped with a spatula. The mark for each sample was then rated for adherence and visibility. The results of the ratings are shown in Table II.

The results indicate the silicate-to-alkali metal oxide ratios above 3.25 significantly decrease adherence of the composition when applied to a hot surface i.e. at 2000° F. The applied coating becomes powdery and friable and tends to scrape off. Material having a ratio below 2.60 does not have sufficient thermal resistance for high temperature use and flows too readily leaving an illegible mark. Similarly, pigment to binder ratios above 1.0 significantly reduce adherence of material applied to hot surfaces. Ratios below 0.50 result in marks having very poor visibility because of low pigment content. The water content of the material is adjusted so as to comprise about 42 to 57 percent by weight of the final composition. This produces a material having viscosity between 800 and 5000 centipoise which is suitable for spray application. At viscosities lower than 800 centipoise the material will not have adequate anti-settling characteristics. On the other hand, at viscosities over 5000 centipoise it is difficult to atomize and spray the material. Desirably, the water content is adjusted so as to obtain viscosity between 1000 to 3000 centipoise for the best combination of anti-settling and spraying properties. Use of potassium silicate or alkali metal silicates other than sodium silicate in amounts greater than 50 percent significantly increase viscosity and are undesirable. The effect of potassium silicate on viscosity is shown by Sample No. 9 in Table II.

In addition to the above-mentioned ranges of alkali-metal silicate and pigment materials, the amount of cross-linking binder has been found to be critical. $B_2O_3$ contents below 1.5% by weight of total solids do not produce an ink suitable for application at temperatures above at least 1800° F. Thus, a $B_2O_3$ content of at least 1.5% is essential for the composition of the present invention. The maximum $B_2O_3$ is about 5.0 percent. In excess of this amount, the material becomes subject to gelation and poor package stability.

TABLE I

| | Parts by Weight SAMPLE NO. | | | | | | | | | | | | |
|---|---|---|---|---|---|---|---|---|---|---|---|---|---|
| INGREDIENT | 1 | 2 | 3 | 4 | 5 | 6 | 7 | 8 | 9 | 10 | 11 | 12 | 13 |
| Sodium Silicate Solution | | | | | | | | | | | | | |
| (A) 31.9% Solids $SiO_2/Na_2O = 3.85$ | 49.9 | 53.3 | 46.5 | 44.1 | 42.6 | 42.6 | — | — | — | — | 41.0 | 39.8 | — |
| (B) 44.1% Solids $SiO_2/Na_2O = 2.00$ | 20.2 | 14.8 | 24.0 | 32.0 | 31.0 | 31.0 | — | 31.6 | — | 30.6 | 29.9 | 28.9 | 31.8 |
| (C) 41.2% Solids $SiO_2/Na_2O = 3.00$ | — | — | — | — | — | — | 65.9 | — | — | — | — | — | — |
| (D) 32.0% Solids $SiO_2/Na_2O = 3.75$ | — | — | — | — | — | — | — | 43.5 | 37.0 | 42.1 | — | — | 43.8 |
| Potassium Silicate Solution 38.8% Solids $SiO_2/K_2O = 2.10$ | — | — | — | — | — | — | — | — | 27.0 | — | — | — | — |
| Borax | 2.2 | 2.3 | 3.5 | 3.3 | 6.5 | 3.2 | 3.2 | — | 2.8 | — | 3.1 | 3.0 | — |
| Boric Oxide | — | — | — | — | — | — | — | 1.2 | — | — | — | — | 0.6 |
| Busan 11-M1,[1] | — | — | — | — | — | — | — | — | — | 4.4 | — | 4.8 | — |
| Kaolin | 4.5 | 4.8 | 4.2 | 4.0 | 3.9 | 5.2 | 5.2 | 5.3 | 4.5 | 5.1 | 5.0 | 4.9 | 5.3 |
| Titanium Dioxide | 18.7 | 20.0 | 17.6 | 16.6 | 16.0 | 18.0 | 18.1 | 18.4 | 15.7 | 17.8 | 17.3 | 16.8 | 18.5 |
| Chromium Sesquioxide | — | — | — | — | — | — | — | — | — | — | 3.7 | — | — |
| PVP/VA, S630[2] | — | — | — | — | — | — | — | — | — | — | — | 1.5 | — |
| CMC[3] | — | — | — | — | — | — | — | — | — | — | — | 0.3 | — |

TABLE I-continued

| INGREDIENT | Parts by Weight SAMPLE NO. | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Water | 4.5 | 4.8 | 4.2 | | | | 7.6 | | 13.0 | — | — | — | — |

(1) Busan 11-M1, Buckman Laboratories, Inc. is 90% by weight Barium Metaborate.
(2) Polyvinyl Pyrrolidone/Vinyl Acetate Copolymer, GAF Corporation.
(3) Carboxymethyl Cellulose, Hercules, Inc.

TABLE II

| | Parts by Weight (Of Solids) | | | | | | |
|---|---|---|---|---|---|---|---|
| | SAMPLE NO. | | | | | | |
| INGREDIENT | 1 | 2 | 3 | 4 | 5 | 6 | 7 |
| $Na_2O \cdot SiO_2$ | 49.4 | 47.6 | 50.1 | 54.2 | 50.8 | 50.8 | 50.7 |
| $K_2O \cdot SiO_2$ | — | — | — | — | — | — | — |
| BORAX | 4.4 | 4.5 | 6.9 | 6.3 | 12.1 | 6.0 | 6.0 |
| BARIUM METABORATE | — | — | — | — | — | — | — |
| ($B_2O_3$) | 1.6 | 1.7 | 2.6 | 2.3 | 4.5 | 1.9 | 2.2 |
| KAOLIN | 9.0 | 9.5 | 8.3 | 7.7 | 7.3 | 9.7 | 9.7 |
| $TiO_2$ | 38.0 | 39.5 | 34.7 | 31.9 | 29.8 | 33.5 | 33.7 |
| $Cr_2O_3$ | — | — | — | — | — | — | — |
| PVP/VA, S630 | — | — | — | — | — | — | — |
| CMC | — | — | — | — | — | — | — |
| % SOLIDS | 50.3 | 50.8 | 49.2 | 52.1 | 53.6 | 53.7 | 53.6 |
| RATIO SOLUBLE SILICATE SOLIDS/ALKALI METAL OXIDE SOLIDS | 2.97 | 3.17 | 2.86 | 2.70 | 2.70 | 2.70 | 3.00 |
| PIGMENT/BINDER RATIO | 0.86 | 0.96 | 0.75 | 0.65 | 0.59 | 0.77 | 0.77 |
| VISCOSITY (Centipoise) | 1760 | 2900 | 1275 | 2200 | 2700 | 3000 | 3200 |
| ADHERENCE % | 85/90 | 65/75 | 100 | 100 | 95* | 100 | 100 |
| VISIBILITY | Good | Fair | Very Good | Good | Fair | Exc. | Exc. |

| | SAMPLE NO. | | | | | |
|---|---|---|---|---|---|---|
| INGREDIENT | 8 | 9 | 10 | 11 | 12 | 13 |
| $Na_2O \cdot SiO_2$ | 52.8 | 26.0 | 49.7 | 47.5 | 45.6 | 53.5 |
| $K_2O \cdot SiO_2$ | — | 23.2 | — | — | — | — |
| BORAX | — | 6.2 | — | 5.6 | 5.4 | — |
| BARIUM METABORATE | — | — | 8.1 | — | 7.7 | — |
| ($B_2O_3$) | 2.3 | 2.2 | 2.1 | 2.0 | 4.1 | 1.1 |
| KAOLIN | 10.1 | 9.9 | 9.4 | 9.0 | 8.8 | 10.2 |
| $TiO_2$ | 34.9 | 34.7 | 32.8 | 31.2 | 30.2 | 35.2 |
| $Cr_2O_3$ | — | — | — | 6.7 | — | — |
| PVP/VA, S630 | — | — | — | — | 2.7 | — |
| CMC | — | — | — | — | .5 | — |
| % SOLIDS | 52.8 | 45.3 | 54.3 | 55.4 | 56.7 | 52.5 |
| RATIO SOLUBLE SILICATE SOLIDS/ALKALI METAL OXIDE SOLIDS | 2.68 | 2.79 | 2.68 | 2.72 | 2.70 | 2.68 |
| PIGMENT/BINDER RATIO | 0.81 | 0.80 | 0.73 | 0.89 | 0.88 | 0.83 |
| VISCOSITY (Centipoise) | 4420 | 6200 | 3300 | 3000 | 3900 | 3250 |
| ADHERENCE % | 100 | 95** | 100 | 100 | 100 | 50/60 |
| VISIBILITY | Exc. | Good | Exc. | Exc.*** | Exc.**** | Good |

*Marks were bubbly causing some loss upon scraping.
**Spotty flaking and loss upon scraping. Difficult to spray because of high viscosity.
***Stable at prolonged exposure to temperature above 1800° F.
****Mixture does not settle on standing. Marks resist softening at 90% relative humidity.

Table III shows examples of compositions within the scope of the invention prepared by concurrent mixing of the ingredients. Example 14 was prepared using a single starting solution of sodium silicate. Example 15 was prepared using two diverse starting solutions having a large difference in $SiO_2/Na_2O$ ratio. For Example 16 two solutions were used but the difference in $SiO_2/Na_2O$ ratio was not nearly as large as in Example 15.

TABLE III

| | Parts by Weight EXAMPLE NO. | | |
|---|---|---|---|
| INGREDIENT | 14 | 15 | 16 |
| Sodium Silicate Solution | | | |
| (D) 42.7% Solids $SiO_2/Na_2O = 2.88$ | 63.9 | — | — |
| (E) 31.9% Solids $SiO_2/Na_2O = 3.85$ | — | 48.6 | — |
| (F) 44.1% Solids $SiO_2/Na_2O = 2.00$ | — | 25.0 | — |
| (G) 41.2% Solids $SiO_2/Na_2O = 3.00$ | — | — | 32.9 |
| (H) 43.1% Solids $SiO_2/Na_2O = 2.84$ | — | — | 31.7 |
| Borax | 3.2 | 3.7 | 3.3 |
| Kaolin | 5.2 | 4.4 | 5.2 |
| Titanium Dioxide | 18.0 | 18.3 | 18.0 |
| Water | 9.7 | — | 8.9 |

TABLE III-continued

| INGREDIENT | Parts by Weight EXAMPLE NO. | | |
|---|---|---|---|
| | 14 | 15 | 16 |
| | 100.0 | 100.0 | 100.0 |

Table IV shows the viscosity and compositions of the samples listed in Table III. It is apparent that the material prepared from two diverse starting solutions has significantly lower viscosity than that prepared from a single solution.

TABLE IV

| INGREDIENT | Parts by Weight (Of Solids) EXAMPLE NO. | | |
|---|---|---|---|
| | 14 | 15 | 16 |
| $Na_2O.SiO_2$ | 50.8 | 50.1 | 50.7 |
| Borax | 6.0 | 7.0 | 6.1 |
| ($B_2O_3$) | 2.2 | 2.6 | 2.2 |
| Kaolin | 9.7 | 8.3 | 9.7 |
| Titanium Dioxide | 33.5 | 34.6 | 33.5 |
| % Solids | 53.7 | 52.9 | 53.8 |
| Ratio Soluble Silicate Solids/Sodium Oxide Solids | 2.88 | 2.86 | 2.92 |
| Pigment/Binder Ratio | 0.76 | 0.76 | 0.76 |
| Viscosity* | 4300 | 3500 | 3450 |

*Brookfield Viscometer, #3 Spindle 20 rpm.

Example 17 was prepared to show the effect of mixing borax with a starting solution of high $SiO_2/Na_2O$ ratio prior to mixing with a low-ratio solution and addition of the balance of the ingredients.

In Example 18 the borax was first mixed with the low-ratio solution.

Finally, in Example 19 all the ingredients were mixed concurrently.

EXAMPLE 17

| Step 1 | Mix 3.2 grams of Borax with 45.6 grams Sodium Silicate Solution having 32.0% Solids and a $SiO_2/Na_2O$ ratio of 3.75. Hold for one hour at 160° F. |
|---|---|
| Step 2 | Add to the solution of Step 1, 30.4 grams Sodium Silicate Solution having 44.1% Solids and a $SiO_2/Na_2O$ ratio of 2.00. Hold for one hour at 160° F. |
| Step 3 | Add 5.3 grams Kaolin and 18.5 grams Titanium Dioxide. |

EXAMPLE 18

| Step 1 | Mix 3.2 grams of Borax with 30.4 grams Sodium Silicate Solution having 44.1% Solids and a $SiO_2/Na_2O$ ratio of 2.00. Hold for one hour at 160° F. |
|---|---|
| Step 2 | Add to the solution of Step 1, 45.6 grams Sodium Silicate Solution having 32.0% Solids and a $SiO_2/Na_2O$ ratio of 3.75. Hold for one hour at 160° F. |
| Step 3 | Add 5.3 grams Kaolin and 18.5 grams Titanium Dioxide. |

EXAMPLE 19

| Step 1 | Mix 3.2 grams Borax with 45.6 grams Sodium Silicate Solution having a 32.0% Solids and a $SiO_2/Na_2O$ ratio of 3.75 and 30.4 grams Sodium Silicate Solution having 44.1% Solids and a $SiO_2/Na_2O$ ratio of 2.00. Add 5.3 grams Kaolin and 18.5 grams Titanium Dioxide. Hold for two hours at 160° F. |
|---|---|

Table V shows that the lowest viscosity was obtained by concurrent mixing of the ingredients. Addition of the borax to the low-ratio solution also provides a somewhat lower viscosity than when it is added to the high-ratio solution first.

TABLE V

| INGREDIENT | Parts by Weight (Of Solids) EXAMPLE NO. | | |
|---|---|---|---|
| | 17 | 18 | 19 |
| $Na_2O.SiO_2$ | 50.9 | 50.9 | 50.9 |
| Borax | 5.8 | 5.8 | 5.8 |
| ($B_2O_3$) | 2.2 | 2.2 | 2.2 |
| Kaolin | 9.6 | 9.6 | 9.6 |
| $TiO_2$ | 33.6 | 33.6 | 33.6 |
| % Solids | 55.0 | 55.0 | 55.0 |
| Ratio Soluble Silicate Solids/Sodium Oxide Solids | 2.73 | 2.73 | 2.73 |
| Pigment/Binder Ratio | 0.76 | 0.76 | 0.76 |
| Viscosity* (centipoise) | 2900 | 2400 | 2200 |

*Brookfield Viscometer, #3 Spindle 20 rpm.

I claim:

1. A method of making a composition suitable for application to metal products for anti-scaling purposes or to produce legible markings on said products, said method comprising:
    (a) providing a first alkali metal-silicate solution having a ratio of silica-to-alkali metal oxide within the range of 2.0 to 2.8;
    (b) providing a second alkali metal-silicate solution having a ratio of silica-to-alkali metal oxide within the range of 3.0 to 3.9;
    (c) mixing sufficient portions of said first and second solutions to provide a third solution having a ratio of silica-to-alkali metal oxide within the range of 2.60 to 3.25;
    (d) adding a cross-linking binder to one of said alkali metal silicate solutions;
    (e) then adding water to adjust viscosity as necessary and an opacifying pigment to said third solution;
    the final composition of said mixture consisting essentially of (a) solids of from about 30 to about 50 parts by weight of said opacifying pigment, from about 43 to about 58 parts by weight alkali metal silicate binder, at least 50 percent of said alkali metal silicate being sodium silicate, and sufficient cross-linking binder to provide from about 1.5 to about 5.0 parts by weight of $B_2O_3$, the ratio of total pigment to total binder solids being within the range of 0.50 to 1.0 and (b) that amount of water to give said mixture a viscosity within the range of 800 to 5000 centipoise.

2. The method of claim 1 wherein said cross-linking binder is added to said first solution and said first solution is stabilized prior to mixing of said first and second solutions.

3. The method of claim 1 wherein said cross-linking binder is added to said third solution and the steps of mixing said first and second solutions and adding said cross-linking binder are carried out concurrently.

4. The method of claim 1 wherein said binder is at least 90 percent sodium silicate and from about 6 to about 12 parts by weight of kaolin is substituted on a one-to-one basis for a portion of said opacifying pigment.

* * * * *